United States Patent

Gerresheim et al.

[11] Patent Number: 5,879,483
[45] Date of Patent: Mar. 9, 1999

[54] PNEUMATIC VEHICLE TIRE WITH BREAKER PLY ARRANGEMENT CUSHION LAYERS

[75] Inventors: Manfred Gerresheim, Obertshausen-Hausen; Werner Lang, Hanau; Bernd Lowenhaupt, Bensheim; Hans-Joachim Winter, Gelnhausen, all of Germany

[73] Assignee: SP Reifenwerke GmbH, Hanau, Germany

[21] Appl. No.: 686,557

[22] Filed: Jul. 26, 1996

[30] Foreign Application Priority Data

Jul. 31, 1995 [DE] Germany ................ 195 28 008.3

[51] Int. Cl.$^6$ ................ B60C 9/18; B60C 9/22; B60C 11/00
[52] U.S. Cl. ............ 152/209 R; 152/526; 152/531; 152/532; 152/533; 152/536; 152/538
[58] Field of Search ................ 152/526, 538, 152/531–533, 209 R, 536

[56] References Cited

U.S. PATENT DOCUMENTS

| | | | |
|---|---|---|---|
| 2,225,042 | 12/1940 | Elliott | 152/538 X |
| 3,205,931 | 9/1965 | Keefe, Jr. | 152/538 X |
| 3,786,851 | 1/1974 | Mirtain et al. | 152/531 X |
| 3,999,585 | 12/1976 | Grawey | 152/531 |
| 4,155,392 | 5/1979 | Dunderstadt et al. | 152/526 X |
| 4,420,025 | 12/1983 | Ghilardi et al. | 152/531 X |
| 4,454,903 | 6/1984 | Noël et al. | 152/531 X |
| 5,339,878 | 8/1994 | Takase | 152/531 X |
| 5,458,173 | 10/1995 | Yamashita | 152/532 X |
| 5,560,791 | 10/1996 | Kajita | 152/532 X |

FOREIGN PATENT DOCUMENTS

| | | | |
|---|---|---|---|
| 0 648 621 | 4/1995 | European Pat. Off. | 152/532 |
| 7-69004 | 3/1995 | Japan | 152/532 |
| 973944 | 11/1964 | United Kingdom | 152/538 |

*Primary Examiner*—Adrienne C. Johnstone
*Attorney, Agent, or Firm*—Birch, Stewart, Kolasch & Birch, LLP

[57] ABSTRACT

A pneumatic vehicle tire comprises a carcass, a tread strip, and a breaker arrangement arranged between the carcass and the tread strip. The breaker arrangement includes at least two breaker plies which have threads or cords which serve as load-carrying members and extend at an angle to the mid-circumferential plane of the tire. A breaker cover surrounds the breaker arrangement at least in the region of the breaker arrangement's axial side edges. The breaker cover has at least one cover ply consisting of threads or cords which extend at least substantially in the circumferential direction of the tire. The breaker cover is formed of a helically wound strip bandage. At least one respective ply separating cushion layer is present in each of the two axial side regions of the breaker arrangement.

17 Claims, 2 Drawing Sheets

PNEUMATIC VEHICLE TIRE WITH BREAKER PLY ARRANGEMENT CUSHION LAYERS

BACKGROUND OF THE INVENTION

Field of the Invention

The present invention relates to a pneumatic vehicle tire comprising a carcass, a tread strip, and a breaker arrangement arranged between the carcass and the tread strip. The breaker arrangement includes at least two breaker plies which have threads or cords which serve as load-carrying members and extend at an angle to the mid-circumferential plane of the tire. A breaker cover overlies the breaker arrangement at least in the region of the breaker arrangement's axial side edges. The breaker cover has at least one cover or bandage ply including of threads or cords which extend at least substantially in the circumferential direction of the tire.

SUMMARY OF THE INVENTION

It is a general object of the present invention to design pneumatic vehicle tires having a harmonious construction with respect to the positioning of the tire's individual components. This harmonious construction results in the best possible tire characteristics, in particular high speed running characteristics and good tire durability.

During construction, account must be taken of the fact that the usual manufacturing processes can cause material shifts. During construction, the tire is built up on a mainly cylindrical building drum and is later brought into its final toroidal shape. During the final vulcanization and molding step, when the tire is both heated and under pressure, material shifts are a problem.

An object of the present invention is to provide a pneumatic vehicle tire which is characterized by a particularly harmonious layout of the tire's individual components. The layout facilitates good tire characteristics and long durability.

In the layout, a breaker cover is formed as a helically wound strip bandage. Also, at least one ply-separating cushion layer is present in each of two axial side regions of the breaker arrangement.

By means of the cushion layers, the side regions, which are particularly critical regions of the tire, are specially improved and protected. The side regions are stabilized so that the danger of material shifts is minimized. The load-carrying members of the plies, namely the cords or threads, are prevented from contacting one another which can lead to damage to the cords or threads and thus to deterioration of the tire.

Such cushion layers are preferably provided between the axial side edges of the radially outermost breaker ply and the strip bandage, between the axial side edges of radially sequential breaker plies, and between the carcass and the axial side edges of the radially innermost breaker ply.

The cushion layer between the axial side edges of the radially innermost breaker ply and the carcass is preferably formed in the manner of a wedge-shaped cushion. The wedge-shaped cushion gives particularly good stabilization results in this strongly loaded tire region. This cushion layer can also be formed by two sidewall strips, each extended to be beneath the radially innermost breaker ply. In this way, the carcass is stabilized during shaping and a particularly good tire uniformity is achieved.

All of the cushion layers can be formed of a rubber material. This ensures a particularly good connection to the remaining components of the tire. The characteristics of the rubber material are selected so that a precise spacing of the individual ply ends results, meaning the plies of the ply assembly have well-defined relative positions. Thus, a rubber mixture with a hardness in the range of 65° to 75°, in particular 74°, Shore A is the preferred material to be used as the cushion layers. Softer mixtures can fundamentally also be used. For example, in the case of the cushion layer between the carcass and the radially innermost breaker ply, the sidewall strip may be used as the cushion layer and may have a softer mixture.

The thickness of the cushions layers, i.e. the mean extent in the radial direction of the tire between the radially outermost breaker ply and the strip bandage and also between the individual breaker plies should a-mount to at least 0.3 mm. This thickness ensures adequate stabilization and security against damage. The width of the cushion layers is preferably between 10 and 40 mm, in particular approximately 20 mm. This width results in particularly good tire durability.

The thickness of the cushion layer between the carcass and the radially innermost breaker ply is preferably at least 1.0 mm, when the breakers are arranged in a customary breaker arrangement. A customary breaker arrangement is a breaker arrangement in which the axial width of the individual breaker plies reduces from the inside to the outside, similar to the breaker arrangement of FIG. 1.

The axial width of the breaker plies can, however, increase from the inside to the outside, similar to the breaker arrangement of FIG. 2. In this case, the thickness of the cushion layer between the carcass and the radially innermost breaker ply is preferably at least 0.5 mm.

The thickness values relate to only the cushion layer itself. In addition, the topping rubber layer, formed on and between the cords of the ply material and the strip material during calendaring, is present and can amount to a thickness in the range of 0.1 to 0.2 mm per cord ply.

The thickness measures given above result in a particularly harmonious tire assembly having a very uniform transition from the axial edge region of the tire to the breaker region. The uniform transition leads to good tire durability. Moreover, material shifts during the manufacturing of the tire, which in particular occur from the less extended axial edge region to the more extended middle tire region, are significantly reduced relative to the customary breaker ply arrangement with a breaker ply width which reduces from the inside to the outside.

In accordance with a further feature, the axial edges of the breaker plies may be curved radially towards the inside, as illustrated in FIG. 3. The breaker arrangement is so designed that its contour corresponds at least approximately to the outer contour of the treadstrip of the tire. In this manner, a particularly harmonious tire build-up is achieved, and also a particularly good tire durability results.

The design of the breaker arrangement with radially inwardly curved edges can preferably be achieved by using a correspondingly shaped undertread layer. The radially inner boundary surface of the undertread layer then brings the breaker arrangement lying beneath it into the desired shape. This is advantageously simply to achieve during manufacturing of the tire.

In accordance with a preferred design of the invention, the breaker arrangement has threads or cords of textile material, in particular of aramid. In accordance with a further preferred embodiment, threads or cords of glass or carbon fiber are present. Also, steel cords can be used.

The use of aramid cords has proved to be advantageous in conjunction with a breaker arrangement which follows the outer contour of the of the tread strip. It has also proved advantageous to use threads or cords of textile material, in particular aramid, in the strip bandage. However, threads or cords of glass or carbon fiber can also be used here.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
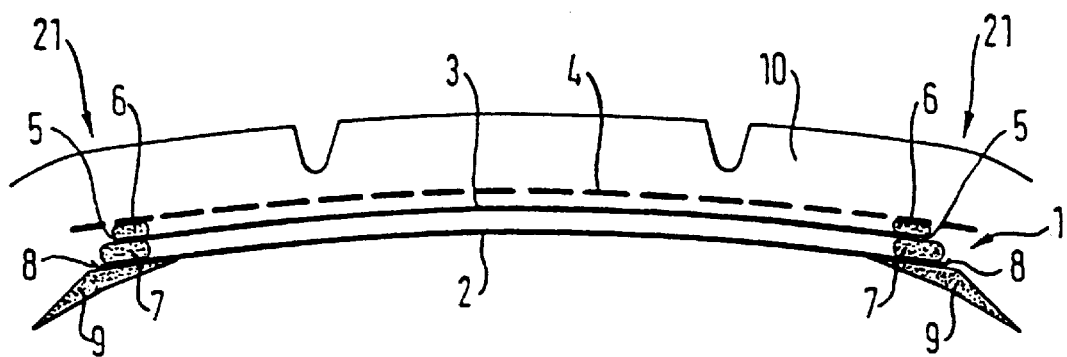
FIG. 1 is a cross-sectional view of a pneumatic vehicle tire according to the invention with the breaker ply widths decreasing from the inside to the outside in a radial direction of the tire.

The pneumatic vehicle tire shown in FIG. 1 has a breaker arrangement 1 comprising two cut-breaker plies, namely a radially inner breaker ply 2 and a radially outer breaker ply 3. The two cut-breaker plies are surrounded by a helically wound strip bandage 4. The radially inner breaker ply 2 has a greater axial width than the radially outer breaker ply 3.

In the region of two axial side edges 5 of the radially outer breaker ply 3, a first cushion layer 6 of rubber material is provided between the radially outer breaker ply 3 and the strip bandage 4. The first cushion layer 6 has a thickness, i.e. in the radial direction of the tire, of at least 0.3 mm. A second cushion layer 7 of rubber material with a thickness of at least 0.3 mm is provided between the radially inner breaker ply 2 and the radially outer breaker ply 3. The second cushion layer 7 is also provided in the region of the axial side edges 5 of the radially outer breaker ply 3 and in the region of axial side edges 8 of the radially inner breaker ply 2. Finally, a third cushion layer 9, of rubber material which is shaped in the form of a wedge-like cushion, is provided in the region of the axial side edges 8 of the radially inner breaker ply 2. The third cushion layer 9 is located between the radially inner breaker ply 2 and a carcass which is not shown here.

The axial width of the first and second cushion layers 6 and 7 is sufficient to protect the load-carrying members of the tires in the edge region 21. The third cushion layer 9 preferably has a greater width relative to the first and second cushion layers 6 and 7. A tread strip 10, of the pneumatic vehicle tire of the invention, is indicated radially outside of the strip bandage 4.

Figure 2:
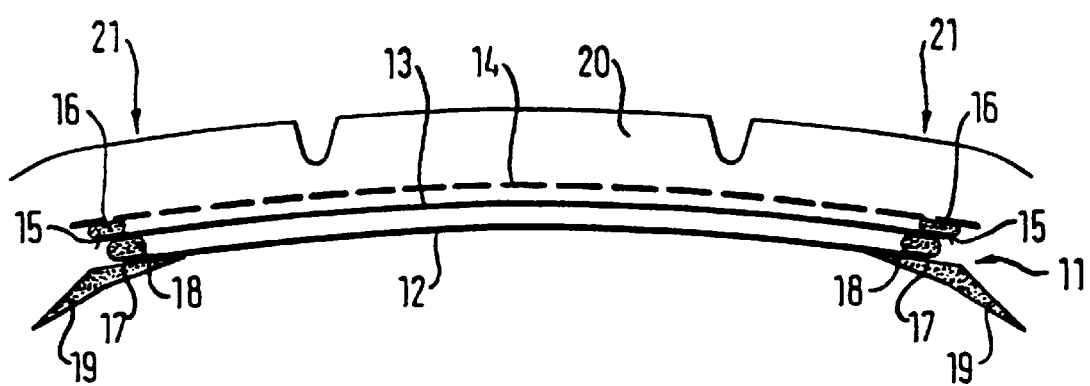
FIG. 2 is a cross-sectional view of a pneumatic vehicle tire according to the invention with the breaker ply widths increasing from the inside to the outside in a radial direction of the tire.

In the embodiment of the pneumatic tire illustrated in FIG. 2, the breaker arrangement 11 likewise has a radially inner breaker ply 12 and a radially outer breaker ply 13 which are respectively formed as cut edge breakers. In this embodiment, the radially inner breaker ply 12 is, however, axially narrower than the radially outer breaker ply 13. Here, the breaker arrangement 11 is also surrounded by a helically wound strip bandage 14.

In the region of two axial side edges 15 of the radially outer breaker ply 13, a first cushion layer 16 of rubber material is provided between the radially outer breaker ply 13 and the strip bandage 14. The first cushion layer 16 has a thickness of at least 0.3 mm. Also, a second cushion layer 18 of rubber material with a thickness of at least 0.3 mm is provided between the radially inner breaker ply 12 and the radially outer breaker ply 13 in the region of their axial side edges 15 and 17. Finally, a third cushion layer 19 of rubber material is provided in the region 21 of the two axial side edges 17 of the radially inner breaker ply 12. The third cushion layer 19 is located between the radially inner breaker ply 12 and a non-illustrated carcass and has the form of a wedge-like cushion. In this embodiment, the thickness of the third cushion layer is at least 0.5 mm. The axial widths of the first, second and third cushion layers 16, 18 and 19 can be the same as the widths in the embodiment of FIG. 1. In FIG. 2, the tread strip 20 of the pneumatic vehicle tire is also indicated.

Figure 3:
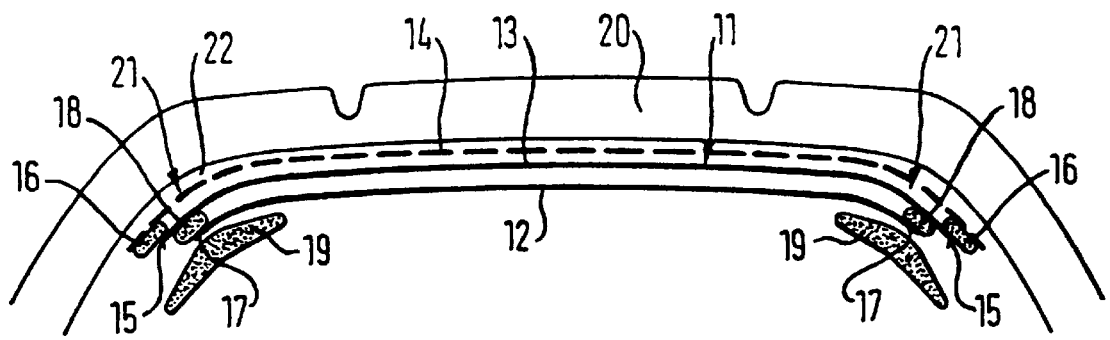
FIG. 3 illustrates an alternative embodiment of the tire of FIG. 2.

FIG. 3 shows a pneumatic vehicle tire in accordance with the invention which largely corresponds from the point of view of its layout with the embodiment illustrated in FIG. 2. Here, a breaker arrangement 11 built up of cut-breaker plies is also present with a radially inner, narrower breaker ply 12 and a radially outer, broader breaker ply 13. A strip bandage 14 also surrounds the radially outer broader breaker ply 13. First, second and third cushion layers 16, 18 and 19 are also present, the radial thicknesses and axial widths of which can be selected in the above-named manner. In distinction to the embodiment of FIG. 2, the breaker arrangement 11 is, however, here radially inwardly curved in its two axial side regions 21, approximately in accordance with the outer contour of the tread strip 20. The breaker arrangement 11 preferably receives its contour through a correspondingly shaped undertread rubber part 22. The assembly of the tire is in this way very harmonious, in particular the transition from the two axial edge regions of the tire to the breaker region.

In all the embodiments, the strip bandage 4 or 14 can be provided, other than is illustrated. Instead of surrounding the entire width region of the breaker arrangement, the strip bandage may surround only partial regions of their width, and in particular in the regions of the axial side edges 5, 8, 15 and 17 of the breaker plies 2, 3, 12 and 13. The strip bandage 4 or 14 may include a winding of the individual turns so that they abut one another, an overlapping winding, or a winding with a spacing between sequential turns. Also, both the width of the overlap, and also the spacing, can vary over the width of the tire.

The threads or cords which serve as load-carrying members of the breaker plies 2, 3, 12 and 13, and also of the strip bandage 4 and 14, preferably consist of aramid.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A pneumatic tire comprising:

a carcass;

a tread strip;

a breaker arrangement arranged between said carcass and said tread strip, said breaker arrangement including a first breaker ply and a second breaker ply, each of said first and second breaker plies including threads or cords which serve as load carrying members and which extend at an angle to a mid-circumferential plane of said pneumatic tire, said first breaker ply being located at a radially inner side of said pneumatic tire and said second breaker ply being located at a radially outer side of said pneumatic tire;

a breaker cover which surrounds said breaker arrangement at least in regions of axial side edges of said breaker arrangement, said breaker cover including a cover ply including threads or cords which extend substantially in a circumferential direction of said pneumatic tire, said breaker cover being formed as a helically wound strip bandage;

a first cushion layer located between said breaker cover and said second breaker ply in each of said regions of axial side edges of said breaker arrangement;

a second cushion layer located between said first breaker ply and said second breaker ply in each of said regions of axial side edges of said breaker arrangement; and a third cushion layer located between said carcass and said first breaker ply in each of said regions of axial side edges of said breaker arrangement.

2. The pneumatic tire according to claim 1, wherein said threads or cords of said first and second breaker plies are constructed of glass fiber.

3. The pneumatic tire according to claim 1, wherein said threads or cords of said first and second breaker plies are constructed of carbon fiber.

4. The pneumatic tire according to claim 1, wherein said first, second and third cushion layers are each formed of a rubber material.

5. The pneumatic tire according to claim 1, wherein said second cushion layer has a thickness, taken in a radial direction of said pneumatic tire at an axial side edge of the narrower of said first and second breaker plies, of at least 0.3 mm.

6. The pneumatic tire according to claim 1, wherein said third cushion layer has a wedge shape.

7. The pneumatic tire according to claim 1, wherein said third cushion layer has a thickness, taken in a radial direction of said pneumatic tire at an axial side edge of said first breaker ply, of at least 0.5 mm.

8. The pneumatic tire according to claim 1, wherein said first cushion layer has a thickness, taken in a radial direction of said pneumatic tire at an axial side edge of said second breaker ply, of at least 0.3 mm.

9. The pneumatic tire according to claim 1, wherein said threads or cords of said first and second breaker plies are constructed of textile material.

10. The pneumatic tire according to claim 9, wherein said textile material is aramid.

11. The pneumatic tire according to claim 1, wherein said threads or cords of said breaker cover ply are constructed of textile material.

12. The pneumatic tire according to claim 11, wherein said textile material is aramid.

13. The pneumatic tire according to claim 1, wherein said regions of axial side edges of said breaker arrangement are curved radially inwardly.

14. The pneumatic tire according to claim 13, wherein the contour of said corresponds approximately to an outer contour of said tread strip.

15. The pneumatic tire according to claim 1, wherein said tread strip includes an undertread layer which is curved radially inwardly, and wherein said regions of axial side edges of said breaker arrangement are curved radially inwardly due to the curvature of said undertread layer.

16. The pneumatic tire according to claim 1, wherein said first radially inner breaker ply has an axial width which is greater than that of said second radially outer breaker ply.

17. The pneumatic tire according to claim 1, wherein said first radially inner breaker ply has an axial width which is less than that of said second radially outer breaker ply.

* * * * *